3,150,202
METHOD OF TREATING OLEFINS
Robert L. Holt, Nederland, and Carroll L. Crawley, Houston, Tex., assignors to Texaco Inc., New York, N.Y., a corporation of Delaware
No Drawing. Filed Nov. 7, 1960, Ser. No. 67,522
2 Claims. (Cl. 260—683.2)

This invention relates to a method of treating olefins, and more particularly to the treatment of an olefinic stream containing both straight chain olefins and branched chain olefins.

It is an object of the invention to provide a method for treating an olefinic stream containing both straight chain olefin and branched chain olefin which comprises selectively adsorbing the straight chain olefin and concomitantly isomerizing the branched chain olefin using a molecular sieve adsorbent.

It is another object of the invention to provide a process for the treatment of an olefinic stream of the above type in which the double bond of the olefin molecule of the branchd chain olefin is shifted.

It is still another object to provide a process of the above type characterized by the substantially complete adsorption of the straight chain olefin and by high yields of the isomerized product.

The invention involves broadly treating an essentially olefinic stream having 6 carbon atoms per molecule containing both straight chain olefin and branched chain olefin. In accordance with our invention, the olefinic stream is contacted with a molecular sieve adsorbent which selectively adsorbs the straight chain olefin and isomerizes the branched chain olefin. The shift of double bond that occurs during isomerization of each branched chain olefin molecule takes place more often to an immediately adjacent position, although some shift of the double bond can take place over a greater portion of the molecule. The process is generally conducted at elevated temperatures and in a vapor phase, as explained more fully hereinbelow. The isomerized branched chain olefin may be readily recovered, and the molecular sieve adsorbent may be desorbed to recover the straight chain olefin.

This process may be carried out in a batch operation comprising charging the olefinic containing mixture and molecular sieve adsorbent into a reactor, heating to a reaction temperature for the desired period of time, and recovering the products. In the preferred method, the olefinic stream is passed continuously through a fixed bed containing the molecular sieve adsorbent at suitable operating conditions, the isomerization reaction product being removed from the opposite end of the fixed bed reactor, also as a continuous stream.

The feedstock for the process may be derived from any suitable source including the pure olefin or mixture of olefins having 6 carbon atoms in the molecule. Where desired, the feedstock may be obtained from thermal or catalytic cracking of hydrocarbons such as gas oils. A certain percentage of paraffins, naphthenes or aromatics may be present in the feedstock as impurities, but preferably these impurities should be inert to reaction with the catalyst material. However, straight chain paraffins are adsorbed by the molecular sieve adsorbent, and may affect the sieve loading with a consequent loss in effective olefin separation. The feedstock, therefore, desirably contains over 50% by weight, and preferably over 75% by weight, of olefins comprising both straight chain olefin and branched chain olefin having 6 carbon atoms per molecule.

The molecular sieve adsorbent employed as the catalyst material in our invention comprises certain alumino-silicates such as calcium alumino-silicate of inorganic materials made up of porous crystals wherein the pores of the crystal are of molecular dimension and are of uniform size. A particularly suitable solid adsorbent is a calcium alumino-silicate manufactured by Linde Air Products Company and designated Type 5A molecular sieve. The crystals of this particular calcium alumino-silicate, apparently actually a sodium calcium alumina silicate, have a pore size or diameter of about 5 Angstrom units which is sufficient to admit straight chain olefins to the substantial exclusion of the branched chain olefins. The straight chain olefins are not effectively adsorbed by a molecular sieve adsorbent having a pore size smaller than 5 Angstrom units, nor is selective separation of the olefins as effective with adsorbents having a larger pore size. This particular selected adsorbent is available in various sizes such as $\frac{1}{16}$" and $\frac{1}{8}$" diameter pellets as well as finely divided powder form.

In accordance with the invention of our process, the olefinic stream is contacted with the catalyst at an elevated temperature, and preferably in the vapor phase. The process of this invention is conducted at a temperature range between about 200° F. and 500° F., and preferably between 250° F. and 350° F. Where lower temperatures than the described minimum are employed, the isomerization rate is undesirably slow. On the other hand, where temperatures higher than described maximum are used, cracking, decomposition or other undesirable reactions may occur. Although the pressure employed is not particularly critical, it generally is convenient and economical to conduct the process at atmospheric pressure. However, an increase in rate of reaction and decrease in volume of reaction chamber required may be obtained when low superatmospheric pressures are used, generally not more than about 5 atmospheres being required nor desirable. During the process, the olefinic stream is preferably maintained in a vapor phase. However, a liquid phase may be employed with satisfactory results where a sufficiently high pressure is maintained within the desired temperature range during the reaction. The time of contact is suitably adjusted, and may vary from about 30 seconds to several minutes or hours depending largely on the temperature and the nature of the olefin or olefinic containing mixture. The process is preferably effected with a contact time of about 90 seconds to 30 minutes, but a longer or shorter time may be used when necessary or desirable.

The straight chain olefin adsorbed on the molecular sieve is desorbed or displaced therefrom by known conventional means. The molecular sieve material may be desorbed, for example, by the application of heat up to a temperature of about 500° F. and preferably at subatmospheric pressures, optionally employing a sweep gas such as a low molecular weight paraffin, i.e., methane, ethane, propane, etc., an inert gas, i.e., nitrogen, or superheated steam. The straight chain olefin is recovered, and the resulting desorbed or regenerated molecular sieve material is contacted with fresh feed stock.

Our invention is further illustrated by the following example wherein a fraction containing 8% by weight of normal hexene-1, 60% 2-ethyl-1-butene and 27% 3-methyl-2-pentene was passed through a reaction tube packed with Linde 5 A. molecular sieve material. The reaction was conducted at 275° F. at atmospheric pressure and at such a rate that the contact time was about 10 to 15 minutes.

Under the conditions of the reaction, about 96–99% of the 2-ethyl-1-butene was isomerized to 3-methyl-2-pentene, including both cis and trans forms. It was found that the adsorbed material consisted of about 99% straight chain olefin.

The olefins prepared in accordance with our invention are valuable chemicals useful in preparing a wide variety of products, including the preparation of motor fuel having a high octane number, and as change stocks in polymerization reactions. Isoprene may be prepared by employing as a starting material 3-methyl-2-pentene prepared in the above example. Thus, the 3-methyl-2-pentene is initially isomerized in the presence of a borane catalyst to yield 3-methyl-1-pentene which is subsequently demethylated to yield isoprene.

Having described our invention and certain embodiments thereof, we claim:

1. A method of treating a hexene stream comprising about 8 percent by weight normal hexene-1, about 60 percent 2-ethyl-1-butene and about 27 percent 3-methyl-2-pentene which comprises contacting said hexene stream with a 5 A. molecular sieve at a temperature within the range of about 250° to 350° F., at atmospheric pressure, and at a contact time within the range of about 90 seconds to 30 minutes effecting adsorption of said normal hexene-1 and concomitant isomerization of about 96 to 99 percent of said 2-ethyl-1-butene to 3-methyl-2-pentene, recovering the isomerized branched chain hexene from the unabsorbed product, desorbing said molecular sieve adsorbent, and recovering said normal hexene-1.

2. The method of claim 1 wherein said hexene stream is contacted with said molecular sieve at a contact time of about 10 to 15 minutes and at a temperature of about 275° F.

References Cited in the file of this patent

UNITED STATES PATENTS

| | | |
|---|---|---|
| 2,217,252 | Hoog | Oct. 8, 1940 |
| 2,818,455 | Ballard et al. | Dec. 31, 1957 |
| 2,850,549 | Ray | Sept. 2, 1958 |
| 2,866,835 | Kimberlin et al. | Dec. 30, 1958 |
| 2,921,026 | Fleck et al. | Jan. 12, 1960 |
| 2,988,578 | Fleck et al. | June 13, 1961 |